United States Patent Office 3,431,267
Patented Mar. 4, 1969

3,431,267
SUBSTITUTED 3-(3'-AMINOPROPYL)PIPERIDINES AND PROCESS FOR PREPARATION
Richard Parke Welcher, Old Greenwich, Conn., assignor to American Cyanamid Company, Stamford, Conn., a corporation of Maine
No Drawing. Continuation-in-part of application Ser. No. 409,593, Nov. 6, 1964. This application Aug. 2, 1965, Ser. No. 476,684
U.S. Cl. 260—293　　2 Claims
Int. Cl. C07d 29/28; A01n 9/22

ABSTRACT OF THE DISCLOSURE

2 - substituted-3(3'-aminopropyl)piperidines, useful as pesticides and fungicides, are prepared by catalytic hydrogenation of di- or tri-cyanoethylated ketones of the structure

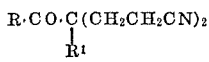

where R is alkyl or aryl and $R^1$ is alkyl, aryl, hydrogen or a cyanoethyl group.

---

This application is a continuation-in-part of application Ser. No. 409,593, filed Nov. 6, 1964, now abandoned.

This invention relates to novel piperidine compounds and to a process for preparing said compounds.

More particularly, this invention relates to substituted 3-(3'-aminopropyl)piperidine compounds of the formula:

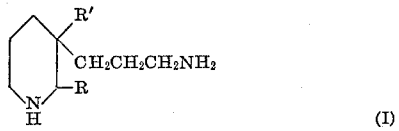

wherein R is alkyl or aryl and R' is a second aminopropyl group ($-CH_2CH_2CH_2NH_2$). Typical alkyl groups are methyl, ethyl, propyl, isopropyl, n-butyl, isobutyl, t-butyl, pentyl, heptyl, nonyl, decyl, dodecyl, tridecyl, heptadecyl, octadecyl, and the like, including isomers thereof. Typical aryl groups are phenyl, naphthyl and anthracyl.

This invention relates further to a process for preparing piperidine compounds of Formula I comprising hydrogenating certain tri-cyanoethylated ketones in accordance with the following generalized hydrogenation reaction:

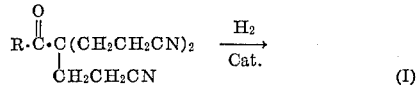

wherein R has the values defined above.

The high yields that are possible by the simple reaction set forth above are very surprising since it would be expected that high molecular weight products and polymers would result by intermolecular condensation of the functional groups of the starting compound.

The starting compounds for the preparation of the compounds (I) of this invention are di- or tricyanoethylated ketones of the structure:

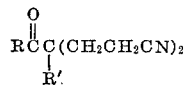

wherein R has the values set forth above and $R^1$ is alkyl, aryl, hydrogen or a cyanoethyl group. Nonlimiting examples of ketones included in this definition are:

4-acetylpimelonitrile
4-acetyl-4-methylpimelonitrile
4-acetyl-4-n-butylpimelonitrile
4-acetyl-4-n-amylpimelonitrile
4-acetyl-4-decylpimelonitrile
4-propionyl-4-valerylpimilonitrile
4-benzoylpimelonitrile
4-benzoyl-4-decylpimelonitrile
4-benzoyl-4-phenylpimelonitrile
4-butyryl-4-decylpimelonitrile
4-heptanoyl-4-octadecylpimelonitrile
4-acetyl-4-(2-cyanoethyl) heptanedinitrile Preferred ketones are those containing not more than 32 carbon atoms.

The starting ketones such as the foregoing are known compounds and are prepared, for example, by the method described by Bruson et al., J. Am. Chem. Soc., 64, 2850 (1942), incorporated herein by reference.

The novel compounds defined by Formula I are prepared by hydrogenating di- or tricyanoethylated ketones in the presence of known hydrogenation catalysts. Numerous catalysts are commercially available for this purpose among which may be mentioned finely divided noble metals such as platinum and palladium, finely divided cobalt and nickel, platinum oxide, and palladium black.

Particularly suitable catalysts are the so-called Raney catalysts, such as Raney nickel and Raney cobalt. These catalysts are generally prepared by treating aluminum alloys of the particular metal with caustic alkali to dissolve the aluminum, thereby leaving finely divided metal with hydrogen absorbed on its surface.

Mixtures of any of the foregoing catalysts are also suitable, such as a mixture of Raney nickel and palladium black.

Other suitable catalysts are described in Winans et al., J. Am. Chem. Soc. 54, 306 (1932), which is incorporated herein by reference.

The amount of catalysts is not critical. From about 0.01% to 10% by weight of catalyst, based on the weight of starting ketone, will be suitable, and preferably from about 1.0% to 5.0% by weight, same basis.

Considerable latitude is also permissible in the choice of other hydrogenation conditions. Thus, the reaction is conveniently carried out in an autoclave pressured with hydrogen as needed at from about 2 atmospheres up to several thousand p.s.i. Preferably, the hydrogen pressure will be from about 300 to 1800 p.s.i. Reaction temperature may be from room temperature (about 20° C.) to elevated temperatures, e.g., up to about 200° C. A preferred range is from about 50° C. to 175° C. Reaction time is determined by the rapidity with which hydrogen is consumed and therefore may vary greatly, e.g., from about 1 hour to several days. A convenient reaction time, given corresponding control of pressure and temperature is from about 2 to 6 hours In like manner, the reaction medium may vary greatly. In some cases, depending on the starting ketone, no solvent or diluent will be required. In other cases, any of the conventional inert hydrogenation solvents may be employed, the particular choice depending on the solubility of the starting ketone. Suitable solvents include hydrocarbons such as xylene, toluene, and the like; alcohols such as ethanol, propanol, and the like; ethers such as dioxane, glyme, diglyme, and the like. Sufficient solvent will be employed to dissolve the starting ketone. The total amount of starting ketone in the reaction mixture is not critical; amounts up to the maximum solubility of the ketone in the solvent may be employed.

Other non-interfering agents may be added to the reaction mixture. For example, it is sometimes advantageous to add ammonia to impede the formation of amine by-products, such as secondary amines, thereby increasing the yield of substituted piperidine product. Small amounts of ammonia will be effective for this purpose, e.g., from about 0.1% to 20% by weight, based on the weight of starting ketones.

The sequence of addition of reactants and catalyst is non-critical. Likewise, the procedures may be batch, semi-continuous or continuous.

It is also possible to interrupt hydrogenation before complete reaction, isolate an intermediate, and then further hydrogenate said intermediate to form the piperidine derivative (I). The intermediate prepared in this manner is, for the most part, the tetrahydropyridine precursor of product (I), having the structure:

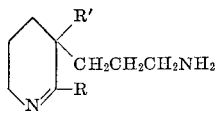

No particular advantage is obtained by a 2-step procedure for preparing product (I), involving isolation of the tetrahydropyridine intermediate and further hydrogenating said intermediate. On the contrary, substantially higher yields of product (I) are obtained by the single step hydrogenation procedure disclosed herein.

Following hydrogenation, the compounds of this invention are separated from unreacted ketone and side products and purified by any convenient means such as filtration, fractional distillation or crystallization, solvent extraction and the like, including combinations of these conventional procedures.

The compounds of this invention exhibit fungicidal and pesticidal activity, particularly in connection with plant protection whether involving treatment of plant seeds, plants in various stages of development, or the soil in which plants grow. By pests are meant insects and mites which infest animals, plants and stored foods.

The toxicant compounds of this invention are ordinarily applied in conjunction with a carrier which may be a solid, liquid or gaseous material. Hence, the preparations may be pastes, powders, emulsions, suspensions, solutions or sprays.

When employed in the form of a powder or dust for killing pests and fungi, the toxicant may be mixed with a substantial proportion of any suitable inert material or diluent, preferably in finely divided form, such as known grades of prepared parasiticide carrier clays, pyrophyllite, fuller's earth, bentonite, sulfur, lime, talc, whiting, diatomaceous earth, etc. Suitable dusts of this type usually contain not less than 0.1% and preferably not less than 1.0% by weight of toxicant.

Liquid pesticide or fungicide sprays containing the toxicant may be prepared by first forming a solution of the compound in a suitable organic solvent, e.g., xylene, petroleum hydrocarbons of high aromatic content, alcohols, esters, ketones, etc., and preferably adding a small amount of wetting or emulsifying agent commonly employed in the art, such as diglycol oleate or p-isooctyl phenyl ether of polyethylene glycol. The resulting concentrate solution is incorporated with water in quantity sufficient to form an aqueous spray dispersion or emulsion having the desired active ingredient concentration.

In a preferred embodiment, aqueous spray dispersions or suspensions may be formed by incorporating in water so-called dry wettable spray powders or water dispersible pastes containing the piperidine compound of the invention. These mixtures may also include inert diluents, suitable quantities of wetting, dispersing and suspending agents and, if desired, secondary toxicants.

The aqueous spray dispersions preferably should contain the toxicant in an amount not less than 1/64 pound per 100 gallons of spray, the more usual concentrations being in the range of 1/16 to 1/2 pound per 100 gallons of spray.

The compounds of this invention not only may be used for killing insects, such as those which invade plants when applied in the usual manner, i.e., directly to the insects or to the portions of the host plants they infest, but may also be applied to the soil, with or without a suitable carrier or diluent, in the vicinity of the growing plant to be protected, the toxicant being absorbed from the soil by the plant. Alternatively, the toxicant can be applied directly to portions of the plant where it is again absorbed and distributed throughout the plant tissues, including portions not directly treated. In either case, the whole plant then becomes toxic to insects which feed on it.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

EXAMPLE 1

A mixture of 26 parts (0.146 mole) of 4-acetyl-4-methylpimelonitrile, 2 parts of Raney cobalt, 5 parts of ammonia and 40 parts of volume of 95% ethanol was hydrogenated in a rocking autoclave of convenient capacity at 120° C. for 4 hours. The autoclave was repressured with hydrogen as needed; pressures varied between 700 and 1400 p.s.i. The product, obtained by distillation, had B.P. 111–113° C. at 8 mm. pressure.

*Analysis.*—Calcd. for $C_{10}H_{22}NH_2$: C, 70.53; H, 13.02; N, 16.45; equivalent wt., 85. Found: C, 71.33; H, 12.39; N, 16.32; equivalent wt., 87. The yield was 77% of 3-(3'-aminopropyl)-2,3-dimethylpiperidine.

Structure:

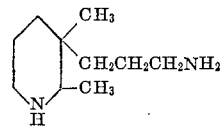

EXAMPLE 2

Under conditions substantially the same as in Example 1, 27.2 parts (0.125 mole) of 4-acetyl-4-(2-cyanoethyl) heptanedinitrile, $CH_3COC(CH_2CH_2CN)_3$, was hydrogenated in a rocking clave. Hydrogen uptake was 73% of theoretical, assuming 7 moles theoretical consumption. The reaction mixture was filtered and fractionated under vacuum to give 3,3-di(3'-aminopropyl) - 2 - methylpiperidine in 74% yield. This product was a white solid, M.P. 53.5–55.0° C., $B.P._{0.65}$ 141–144° C. Theoretical nitrogen content for 3,3-di(3-aminopropyl)-2-methylpiperidine is 19.69% and 19.51% was observed. Titration of the basic groups gave an equivalent weight of 68.8 compared to the theoretical value of 71.1. Infra-red spectrum was consistent with the structure:

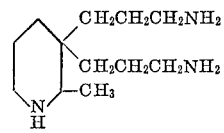

EXAMPLES 3–8

In substantially the same manner as in Examples 1–2, the following products are prepared from the corresponding starting dicyanoethylated ketones:

3-(3'-aminopropyl)-2-methylpiperidine
3-(3'-aminopropyl)-2-n-butyl-3-propylpiperidine
3-(3'-aminopropyl)-3-decyl-2-methylpiperidine
3-(3'-aminopropyl)-2-phenylpiperidine
3-(3'-aminopropyl)-3-decyl-2-phenylpiperidine
3-(3'-aminopropyl)-2,3-diphenylpiperidine

EXAMPLE 9

Determination of fungicidal activity by a modified spore germination technique Spores of *Monilinia fructicola*, the patheogen for American brown rot of stone fruits, were dispersed in deionized water containing 2 parts by volume of orange juice to facilitate germination. To this suspension 100 p.p.m. of the compound of Example 1 was added and the suspension containing test compound was placed in opti-clear vials with polyethylene stoppers. The vials were placed on a tumbler and rotated for 24 hours and then removed and examined microscopically. On examination it was found that 100 p.p.m. of the above compound produced 100% kill of spores.

EXAMPLE 10

Insecticidal activity

The compound of Example 1 was made up in 0.1% solution of acetone and water (50:50 mixture). Nasturtium plants infested with *Aphis rumicis* L. aphids two days prior to treatment were sprayed with the above solution. The sprayed plants were then placed on their sides in white enamel trays and stored in a constant temperature and humidity cabinet at 70° F., 50% relative humidity for two days. On termination of the storage period the plants were examined for mortality of the insects. 64% kill of the nasturtium aphids was achieved.

I claim:
1. A compound of the formula:

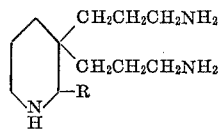

wherein R is selected from the group consisting of lower alkyl and phenyl.

2. 3,3-di(3'-aminopropyl)-2-methylpiperidine.

References Cited

FOREIGN PATENTS 1,211,691   3/1960   France.

OTHER REFERENCES

Albertson, J. Am. Chem. Soc., vol. 72, pp. 259–9 (1950).

Phillips, J. Am. Chem. Soc., vol. 79, pp. 5754–6 (1957).

Takata et al., J. Chem. Soc. of Japan, vol. 85, No. 3, pp. 237–8 (March 1964).

Takata et al., Chem. Abst., vol. 63, col. 2950b&c (1965).

HENRY R. JILES, *Primary Examiner.*

E. D. LEWIS, *Assistant Examiner.*

U.S. Cl. X.R.

260—293.2; 424—267